Patented Dec. 7, 1926.

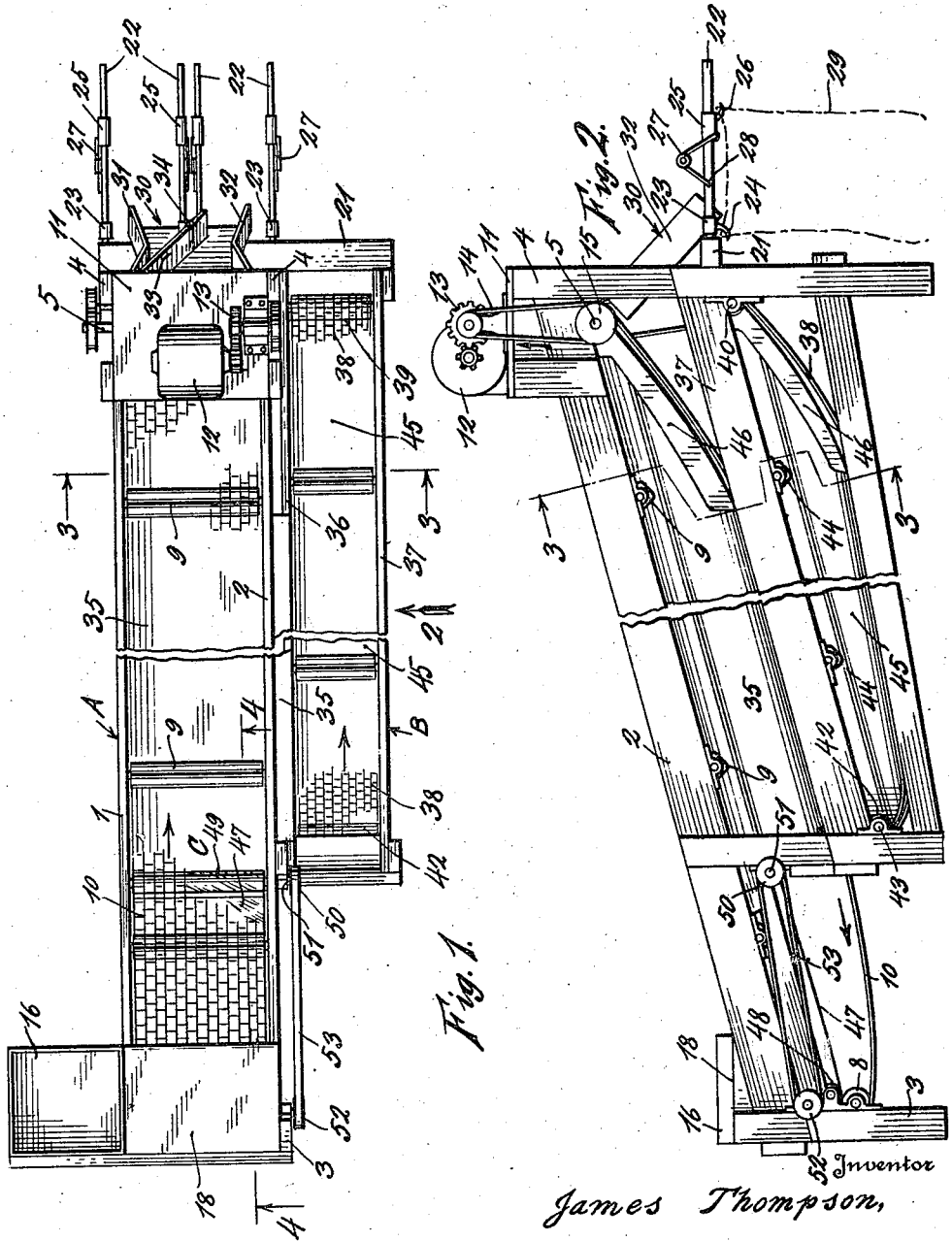

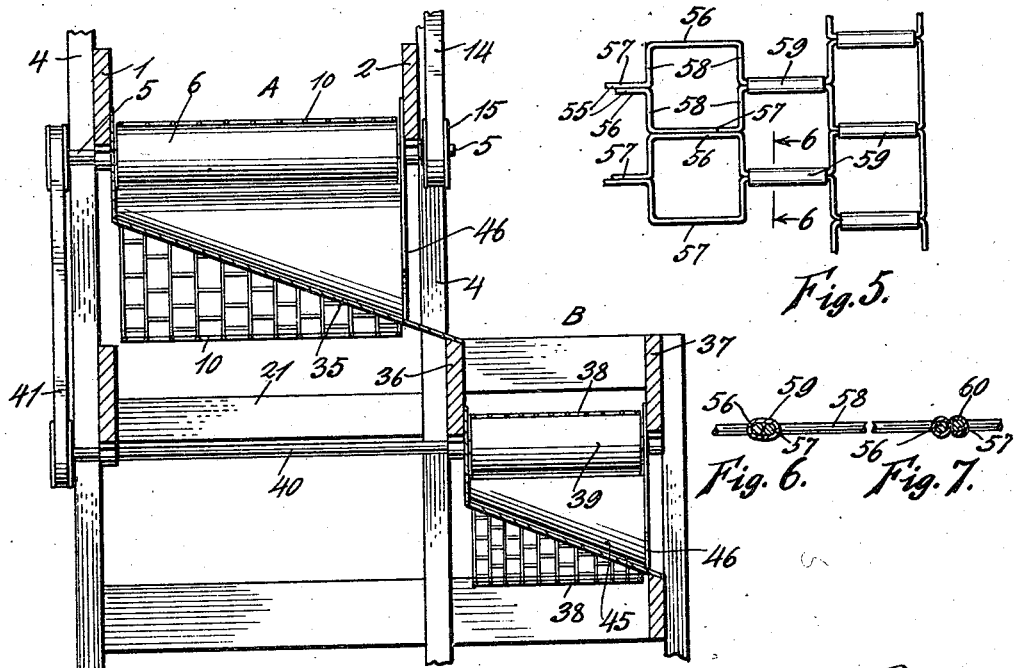
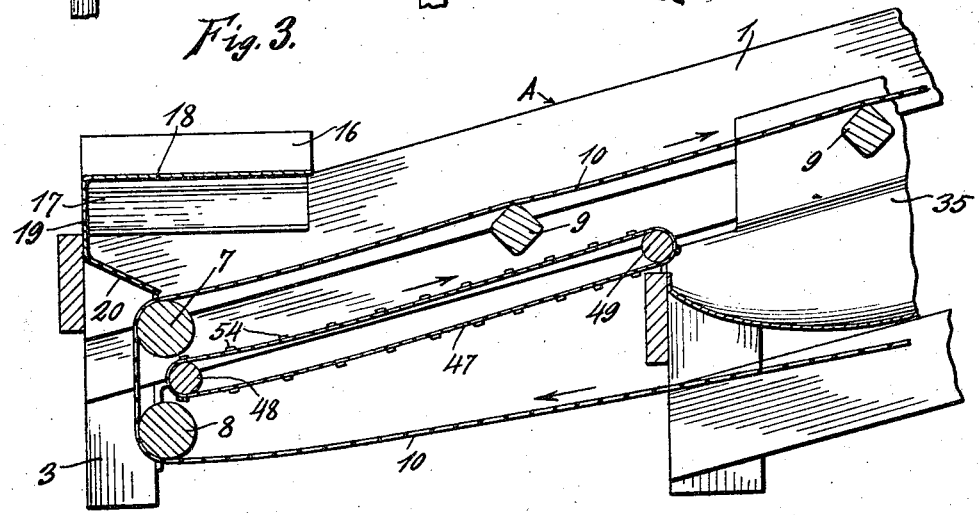

1,609,442

UNITED STATES PATENT OFFICE.

JAMES THOMPSON, OF GREELEY, COLORADO.

POTATO AND ONION GRADER.

Application filed January 16, 1926. Serial No. 81,744.

This invention relates to improvements in potato and onion graders.

It is the object of this invention to produce a potato and onion grader that shall be so constructed that it is convenient to use, simple to construct and which shall have a large capacity. It is a further object to produce a sorting or grading belt that shall be so constructed that it can be cheaply made and which will not scratch or mar the vegetables. It is a still further object to provide a simple and satisfactory sack holder that can be employed with my grader.

My improved grader, briefly described, consists in an inclined conveyor comprising an endless sorting belt whose upper surface is moved upwardly by means of power derived from an electric motor. A hopper is provided at the lower end of the conveyor and a sacker at the upper end. The sorting or grading belt is provided with a large number of holes through which the undersized vegetables drop. These small vegetables drop onto an inclined apron and roll down upon a second conveyor belt which deposits them in a pile or delivers them to sacks.

In order to describe the invention with the greatest clearness so that its construction and mode of operation can be readily understood, I shall have reference to the accompanying drawings in which it has been illustrated and in which:

Fig. 1 is a top plan view of my invention;

Fig. 2 is a side elevation looking in the direction of arrow 2 in Fig. 1;

Fig. 3 is a transverse section taken on line 3—3, Figs. 1 and 2;

Fig. 4 is a longitudinal section taken on line 4—4, Fig. 1;

Fig. 5 is a detail showing the construction of the conveyor belts;

Fig. 6 is a section taken on line 6—6, Fig. 5, and,

Fig. 7 is a section similar to Fig. 6 but showing a slightly modified construction.

My improved machine comprises a pair of conveyors A and B, which are parallel with each other, but at different levels. The upper, or conveyor A, consists of two side members 1 and 2 whose lower ends are connected to the supports 3 and whose upper ends are connected to the upper ends of legs 4. Rotatably secured to the under sides of the upper ends of the sides 1 and 2 is a shaft 5 carrying a roller 6 and rotatably secured to the under surface of sides 1 and 2 near their lower ends is a roller 7. A similar roller 8 is rotatably secured to the forward sides of the legs 3. At spaced intervals, between rollers 6 and 7 are square rolls 9; these have been shown as square but may be hexagonal or of any uncircular cross section as they are merely intended to support the conveyor belt 10 and to act as shakers. The belt 10 surrounds the rollers 6, 7 and 8 and, when in motion, moves in the direction of the arrow C in Fig. 1. Secured to the upper ends of the longer, or supports 4, is a platform 11 upon which is mounted a motor 12 which is connected through a reduction gear 13 and belt 14 with the pulley 15 on the end of the shaft 5. When the motor is in operation the conveyor belt 10 moves in such a direction that its upper surface travels from the lower end towards the upper. Attached to the lower end of conveyor A is a hopper that opens into the conveyor as indicated at 17 in Fig. 4. A member 18 extends over the lower end of the conveyor so as to prevent the vegetables from being thrown out. This member has a downwardly projecting side 19 whose lower end 20 is inclined so as to direct the vegetables onto the conveyor 10. When the vegetables are poured into the hopper, they flow through the opening 17 onto the conveyor belt 10 and are carried along upwardly. The small potatoes and onions drop through the openings in the belt but those that are too large for this are finally delivered to the sacker which is secured to the upper end of the conveyor and which consists of a transverse bar 21 to the front side of which are secured rods 22 of oblong cross section. Sleeves 23 that carry hooks 24 are fastened to the inner end of the rods 22 while sleeves 22 are slidably connected to the bars near their outer ends. These sleeves carry hooks 26 and are urged outwardly by the action of the springs 27 which have one end connected to the bars at 28 while the other end is connected to the sleeves. The sacks 29 are held in the manner indicated in Fig. 2. A chute 30 having sides 31 and 32 extends from the bag holder to a point beneath the delivery end of the conveyor. A board 33 is pivoted at 34 and can be moved about its pivot so as to direct the vegetables into either one of two sacks. The vegetables that drop through the openings in the belt 10 fall onto an inclined apron 35 whose upper edge is secured to the side 1 and whose lower side is secured to the side 36 of conveyor B whose other side has been indicated by numeral 37. A conveyor belt 38 of a similar construction to belt 10 encircles the roller 39 that is mounted on the shaft 40 which is rotated by means of the belt 41, and a roller 42 mounted on the shaft 43, conveyor B, like the conveyor A has a plurality of noncircular rollers 44 that serve to support the upper surface of the belt and to act as shakers. The belt 38 has a smaller opening than the belt 10 so that only the smaller of the vegetables that pass through belt 10 will pass through this belt. The vegetables that pass through the belt 38 drop onto the inclined apron 45 and are carried to one side, while those that are too large to pass through the belt are carried to the top where they may be sacked or conducted by suitable means into proper storage receptacles. The forward ends of the aprons 35 and 45 are curved upwardly so as not to interfere with the belts 10 and 38 and have vertical sides 46 that direct the potatoes downwardly to the straight portion of the aprons. Since the lower end of the conveyor A is too low to permit the vegetables that pass through it to be carried by the apron 35 to the conveyor B, we have provided a short conveyor which comprises an endless belt 47 which lies between the upper and lower portions of the belt 10 and encircles the rollers 48 and 49. A pulley 50 is connected to the end of the shaft 51 and another pulley 52 is connected with the roller 7. A belt 53 connects pulleys 51 and 52 and transmits the power for driving the belt 47. Any vegetables that drop through the belt 10 below the point where the apron 35 stops, are carried up and deposited upon the apron by the conveyor belt 7. As this belt has no function except to convey the vegetables, it may be made of canvas and provided with transverse slats 54.

The conveyor belts 10 and 38 are formed of a plurality of wires or round bars 55 bent back and forth (Fig. 5) so as to have straight parallel sections 56 and 57 connected by straight offsets 58. The parts are arranged as shown in Fig. 5 with the straight section 56 of one in contact with the straight section 57 of the next and the adjacent portions are then connected by a connecting strap 59 like that shown in Fig. 6 or by a similar strap 60 bent into S-shape in the manner shown in Fig. 7.

When in operation, the motor 12 causes the various conveyor belts to move in the direction of the arrows. The vegetables are fed to the hopper 16 and pass from thence onto the conveyor belt 10 where the vegetables below a certain size pass through the belt and are deposited on the conveyor belt 38 where they are submitted to a second grading operation.

Having now described the invention, what is claimed as new is:

A potato and onion grader comprising a conveyor having an endless upper conveyor belt provided with openings, said conveyor being inclined with respect to a horizontal plane, whereby one end is lower than the other, means for moving the conveyor belt in such a direction that its upper surface moves from the lower end towards the upper end, a transversely inclined apron located between the upper and lower sides of the conveyor belt whereby the potatoes and onions that pass through the openings in the conveyor belt are conducted to one side, a second conveyor located to one side of and below the first conveyor, a conveyor belt thereon, means connecting the lower conveyor with the driving mechanism of the upper conveyor belt so that the two will be driven in unison, said second conveyor being so located that it will receive the potatoes and onions that fall through the first conveyor belt onto the transversely inclined apron, a third and shorter conveyor located underneath the lower end of the upper side of the upper conveyor belt and means connected with the upper conveyor belt for driving the short conveyor, said short conveyor being adapted to transfer the vegetables that drop through the lower portion of the upper conveyor to the apron which directs them onto the second conveyor.

In testimony whereof I affix my signature.

JAMES THOMPSON.